Nov. 12, 1963 J. W. ALLEN 3,110,860
ELECTROMAGNETIC TESTING APPARATUS USING AN ECCENTRICALLY
MOUNTED ANNULAR TEST COIL WHOSE AXIS
IS ROTATED ABOUT THE WORKPIECE AXIS
Filed Nov. 6, 1961 2 Sheets-Sheet 1

INVENTOR.
John W. Allen
BY
ATTORNEY

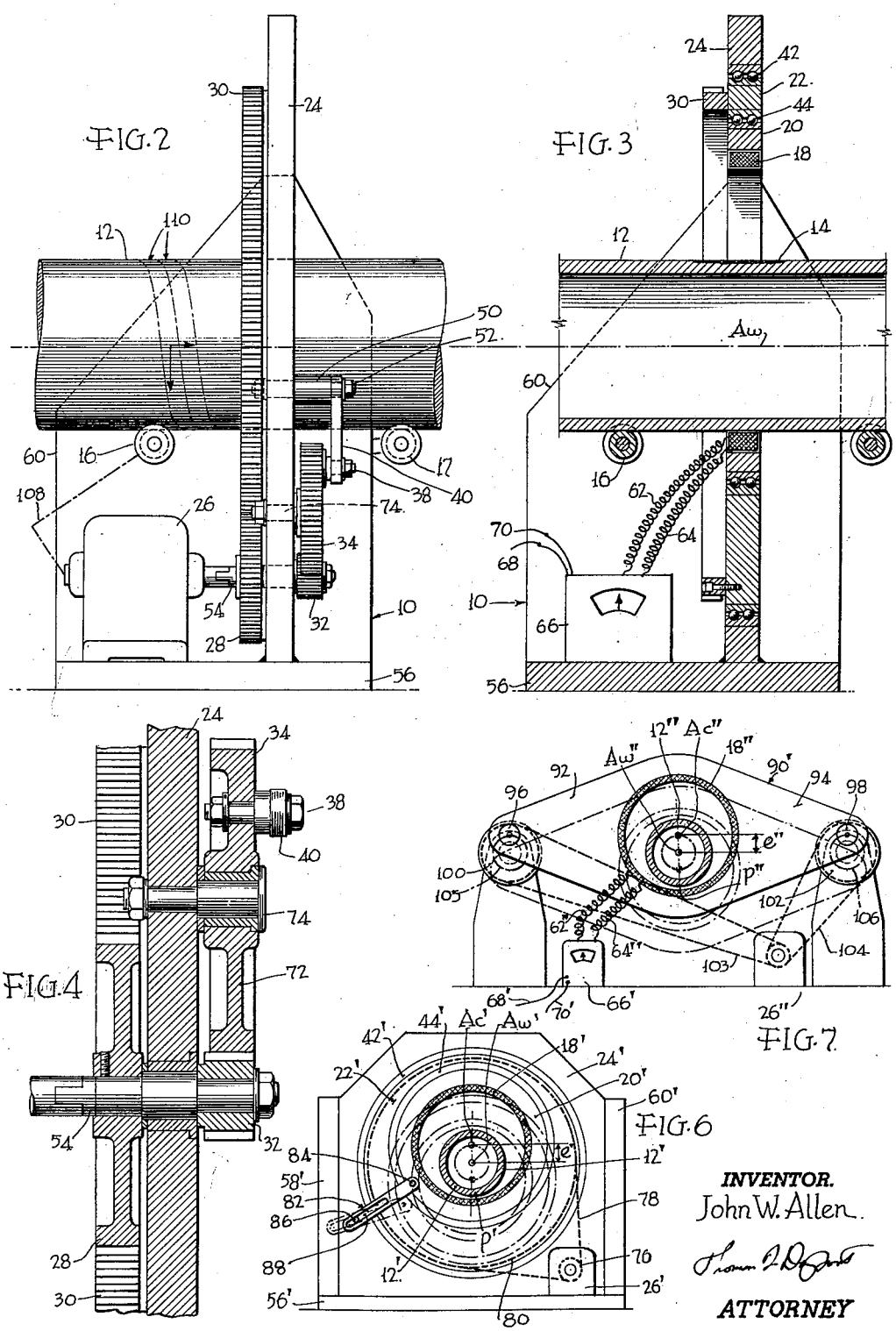

United States Patent Office 3,110,860
Patented Nov. 12, 1963

3,110,860
ELECTROMAGNETIC TESTING APPARATUS USING AN ECCENTRICALLY MOUNTED ANNULAR TEST COIL WHOSE AXIS IS ROTATED ABOUT THE WORKPIECE AXIS
John W. Allen, Malvern, Pa., assignor to The Budd Company, Philadelphia, Pa., a corporation of Pennsylvania
Filed Nov. 6, 1961, Ser. No. 150,486
7 Claims. (Cl. 324—37)

This invention pertains to apparatus for use in electromagnetic testing and, more particularly, to an eddy current search coil translating apparatus for the effective detection and measurement of longitudinal discontinuities such as continuous seams and for the description of angular positions of these and other discontinuities in cylindrical workpieces.

When excited by an oscillating input and electromagnetically coupled with a metallic workpiece, the resistive and reactive impedances of an eddy current search coil are varied by changes in the properties of the workpiece. Two types of search coil arrangements, encircling and tangential, are in general use. The tangential coil or probe, is positioned tangentially of the workpieces and scans only a small sector at any given angular position. Rotation of the workpieces is usually impractical and revolution of the tangential search coil itself around the workpieces requires complex means for connection with input and output circuits.

The more frequently used encircling, or O.D. coil through which workpieces are moved longitudinally, is quite sensitive to workpiece parameters which vary along the length of the workpiece. However, the O.D. coil does not enable description of angular position or sensitive detection of continuous longitudinal discontinuities because it integrates over an angular peripheral cross section of the workpiece. Further, most detection systems are sensitive to rate of change of search coil impedance and therefore would register only the beginning and end of a flaw extending in the direction of workpiece translation.

Therefore, it is an object of this invention to provide electromagnetic testing apparatus adapting an encompassing search coil for a type of tangential probe detection whereby an effective scanning area is revolved about an extended cylindrical workpiece without cumulative rotation of the search coil.

In accordance with an illustrated embodiment of this invention, electromagnetic testing apparatus for the investigation of elongated cylindrical workpiece variables comprises an annular search coil through which a workpiece may be translated, the internal diameter of the coil being substantially greater than the external diameter of the workpiece and the axis of symmetry of the coil being parallel to, but displaced from, the nominal axis of symmetry of the workpiece, means restraining the search coil from cumulative rotation, and means translating the search coil along a circular path concentric with the nominal axis of symmetry of the workpiece, whereby the effective search coil scanning area is revolved about the workpiece.

For a better understanding of the present invention, together with additional objects and advantages thereof, references should be had to the following description taken in conjunction with the accompanying drawings wherein:

FIG. 2 is a side elevation of the FIG. 1 apparatus with support plate 58 removed;

FIG. 3 is a cross section elevation at section 3—3 of the FIG. 1;

FIG. 4 is an enlarged cross section taken at 4—4 of FIG. 1;

FIG. 6 is a schematic illustration of a simplification of the apparatus of FIG. 1;

FIG. 7 is a schematic illustration of an alternative embodiment of the invention.

Figure 1:
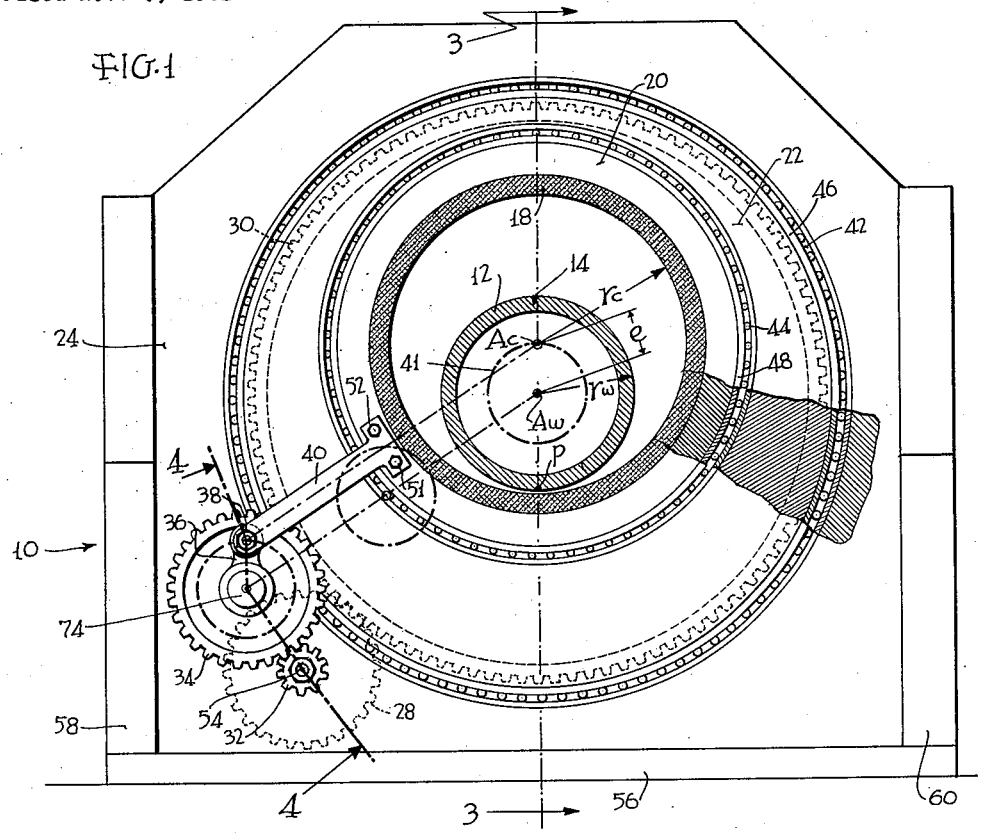
FIG. 1 is an elevation taken normally of an associated cylindrical workpiece illustrating a preferred embodiment of this invention in operative position.

With particular reference to FIGS. 1–4, a preferred eddy current search coil translation apparatus 10 is shown in conjunction with a generalized workpiece 12, a hollow cylindrical conduit or pipe, extending normally of the plane of the drawing in FIG. 1 and having nominally similar lateral cross sections. For purposes of this explanation, a generalized discontinuity 14 is assumed at an incremental sector and to extend longitudinally of workpiece 12. Workpiece 12 is supported by conventional driven and idler rollers 16 and 17 with the nominal workpiece axis of symmetry $A_w$ fixed thereby.

Co-axial search coil 18 per se, may be of the O.D. type well known in the electromagnetic testing art, but has an internal radius $r_c$ substantially greater than the nominal external radius $r_w$ of the workpiece 12. Search coil 18 is co-axially rigidly attached to coil ring 20 which is, in turn, eccentrically and rotatably mounted upon eccentric ring 22. Eccentric ring 22 is rotatably mounted upon support plate 24 for rotation about workpiece axis $A_w$. The axis of symmetry $A_c$ of coil 18 is parallel with but displaced a distance $e$ from workpiece axis $A_w$.

Search coil motion means, powered by motor 26, comprise a driving gear 28 meshed with driven gear 30 which is attached to eccentric ring 22 co-axially of axis $A_w$, and a driving pinion 32 meshed with driven gear 34 which is provided with an attached crank 36 and linked by crank pin 38 to a connecting rod 40 extended from coil ring 20. The positioning means parameters are chosen so that the angular velocities of crank pin 38 and of eccentric ring 22 are equal and in the same sense. Coil 18 will, therefore, be translated along a circular path 41 about axis $A_w$ without any rotation. There is, however, a unique point $p$ of closest tangential approach definable between workpiece 12 and search coil 18 and this so called search point will revolve about workpiece axis $A_w$ at the rotational velocity of eccentric ring 22 while the search coil axis $A_c$ is revolved about $A_w$.

While various expedients will be suggested by those skilled in the art, the preferred embodiment is provided with ball bearing races 42 and 44 located by means of flanges 46 and 48, respectively, between eccentric ring 22 and support plate 24 and between coil ring 20 and eccentric ring 22. Crank 40, as seen more clearly in FIG. 2, is spaced from coil ring 20 by means of post 50 and is fixed against rotation with respect to coil ring 20 by bolts 51 and 52. Driven gear 28 and pinion 32 are fixed to shaft 54 extending through support plate 24 to motor 26. The mount comprises, in addition to support plate 24, a base plate 56 and side plates 58 and 60 welded or otherwise structurally assembled together. Leads 62 and 64, FIG. 3, extend from coil 18 to an indicator means 66 which may, in turn, be coupled by leads 68 and 70 with various recording, marking, and other well known electro-magnetic testing auxiliaries. Crank 36, FIG. 4, may be a spoke 72 or flange portion of gear 34 and pin 38 is provided with retainers for crank 40 which allow for its free rotation relative to pin 38. Support plate 24 provides accommodations for shaft 74 upon which gear 34 rotates freely.

Figure 5:
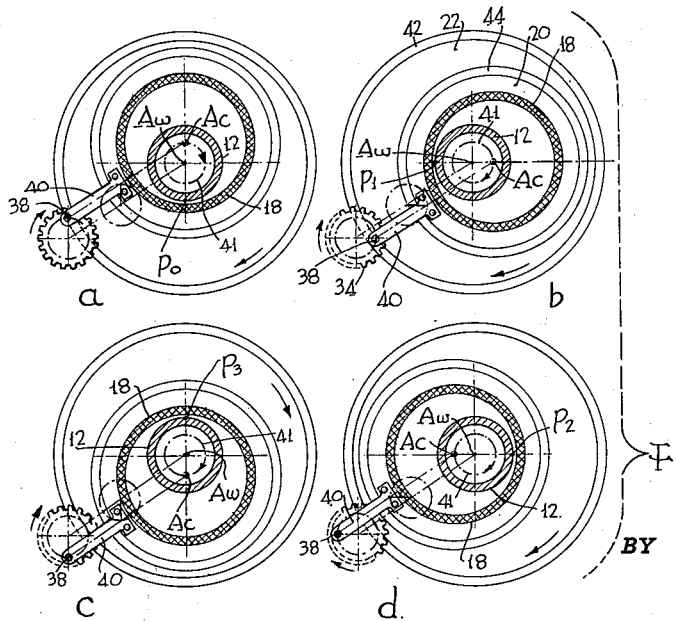
FIG. 5 is a diagram of the rotational and translational motions of the apparatus of FIG. 1.

FIG. 5 at a, b, c and d illustrates sequentially the relative motion of coil 18 with respect to workpiece 12. Search point $p_0$ in FIG. 5a is revolved in 90° increments to positions $p_1$, $p_2$ and $p_3$ as coil axis $A_c$ describes the circular path 41 about workpiece axis $A_w$. The motion of the coil axis $A_w$ is due to the rotation of eccentric ring 22. If coil ring 20 were not decoupled from eccentric ring 22 by ball bearing race 44, coil 18 would itself rotate. However, relative motion is allowed between coil ring 20 and eccentric ring 22 as prescribed by the restraint imposed through the crank linkage. As eccentric ring 22 is rotated, crank pin 38 is also rotated in the same sense and at the same angular velocity so that connecting rod 40 remains parallel with its direction at any given time. This follows necessarily, since the crank pin circle is given a radius equal to the eccentricity $e$ which is the radial displacement of axis $A_c$ with respect to axis $A_w$. With these restraints every point of the rigid structure comprising connecting rod 40, coil ring 20 and coil 18 describes a circle by translation rather than by revolution. For this reason, leads from coil 18 may be taken directly to stationary apparatus and the flexing of the leads, the only relative motion between their ends which must be taken into account, is easily provided for by ordinary coiled lead wire arrangements.

FIG. 6 illustrates a simplified form which the electromagnetic testing apparatus may take when it is not necessary to obviate all rotation of the search coil about its axis. The search coil motion means of the preferred apparatus is replaced by a simpler driving arrangement and a simpler search coil restraint mechanism. Eccentric ring 22' is driven by motor 26' through driving pulley 76 on the motor shaft, belt 78, and driven pulley 80, the latter being mounted on eccentric ring 22' co-axially of ball bearing race 42' and of workpiece axis $A_w'$. Cumulative rotation of search coil 18' is prevented by the action of slotted crank 82, a pin 84 fixed to coil ring 20' and about which the crank 82 is free to rotate, and a pin 86 fixed to support plate 24' and cooperatively engaged in crank slot 88.

As eccentric ring 22' is rotated about workpiece axis $A_w'$, the coil axis $A_c'$ is moved in a substantially continuous and circular path about $A_w'$. While coil 18' and coil ring 20' are again substantially rotationally decoupled by ball bearing race 44', the restraint of crank 82 is not complete, there will be some oscillation allowed, and the motion of effective search point $p'$ will exhibit some velocity variations in its circular motion about workpiece 12'. Quantitative workpiece discontinuity magnitude information is obtained, however, and an approximate angular position indication may be observed. The eccentricity $e'$ is, as before, the separation of the parallel axes $A_c'$ and $A_w'$. Crank slot 88 must, of course, be long enough to accommodate the reciprocating crank motion which is a function of this eccentricity. The dashed outlines in the figure show relative positions after a 90° rotation of eccentric ring 22'.

In the apparatus described thus far, there is a continuous angular rotation of certain elements about the workpiece axis. An alternative is illustrated in FIG. 7. Coil 18" is mounted on a translation plate 90 which may be thought of as a development of the previous coil rings to include two extensions 92 and 94 each of which acts like a connecting rod rigidly extended from the search coil. Pins 96 and 98 are mounted for rotation by pulley disks 100 and 102 and are rotatably engaged in extensions 92 and 94. Belts 103 and 104 couple motor means 26" with pulleys 100 and 102 for rotation at the same angular velocity and in the same direction. As before, every point of the rigid system including coil 18" will be translated in a circular path having a radius defined as that of pin circles 105 and 106. It will be realized, therefore, that the relative position of pins 96 and 98 in the plane of plate 90 does not affect the result. As in the other embodiments, however, the radial line between a crank pin and its axis of rotation must be parallel with the radial line between the workpiece and search coil axes. The equivalent search point $p''$ will then revolve about workpiece 12" at the angular velocity of pins 96 and 98. Accommodation for lead 62" and 64" from coil 18" to indicator means 66' and for other auxiliary circuits is as explained in connection with the FIG. 1 embodiment.

It should now be apparent that the critical parametral relationship according to the invention may be defined as:

$$e = r_c - r_w - s \quad (I)$$

where $e$ is the eccentricity or displacement of the parallel workpiece and search coil axes, $r_c$ is the internal radius of the search coil, and $r_w$ is the external radius of the workpiece. The term $s$ represents the radial separation between coil and workpiece at the equivalent search point and a finite separation is advantageous because neither the search coil nor the workpiece can be expected to have exactly cylindrical surfaces. However, increasing the separation to more than the maximum required for forseeable workpiece variations unnecessarily decreases the selectivity of the electromagnetic coupling at the search point.

The radius of the search coil should be much greater, by a factor of ten or more, than the thickness of the winding of which it is comprised. This assures that the field of the search coil will exhibit a sharp gradient with distance from its surface.

The current density induced in the workpiece through its electromagnetic coupling with the search coil is much higher in the region nearest the coil, the equivalent search point region, than in the remainder of the workpiece. As the search point is revolved about the workpiece, the region of high current density rotates about the surface of the workpiece. The presence of a discontinuity, regardless of its length, results in a change in the field of the search coil as the search point passes. This change may be processed by appropriate electronic circuitry to yield indication or recordation of the parameters of the discontinuity.

Assuming $s$ in Equation I to be small, a further statement of the preferred dimensional relationships may be defined as:

$$r_w \leqslant e \leqslant r_w/4 \quad (II)$$

The upper limit for $e$ is rather indefinite but has been established from practical considerations of the size and momentum of the moving masses. The lower limit is dictated by the search coil field intensity gradient, there being impractical enlargement of the equivalent search "point" when the workpiece and search coil radii become more nearly equal.

As indicated schematically by linkage 108 between motor 26 and roller 16 in FIG. 2, the workpiece 12 may be continuously translated along its axis during scanning procedures. With this translation and the search point rotation properly synchronized, helical search paths 110 may be prescribed for the scanning sweep.

Figure 8:
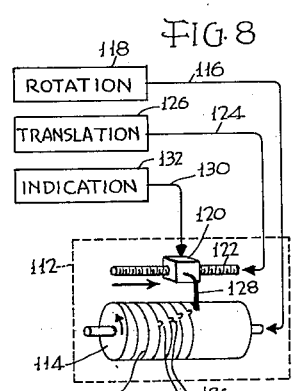
FIG. 8 is a diagram of a read-out arrangement facilitated by this invention.

FIG. 8 illustrates a type of read-out display which is made possible by the apparatus of this invention. A drum recorder 112 comprises drum 114 rotated about its axis in proportion to search point rotation via coupling 116 from one of the illustrated motor means, for example, there represented by block 118. Stylus means 120 may be translated by screw 122 parallel with drum of 114 in proportion to translation of the workpiece via coupling 124 from a device, such as a workpiece support roller, synchronized with the motion and represented by block 126. Stylus 128 may be moved laterally from its normal position proportional to search coil signals via coupling 130 from electronic indicator apparatus represented at 132.

The base tracing by stylus 128 may be a smooth spiral 134 upon which pips 136 are superimposed with the equivalent magnitude and equivalent position of workpiece discontinuities. The shape of each pip and its relative position are informative of discontinuity type. Pip repetition, as shown, may be interpreted as a pictorial representation of an axially extended discontinuity at a determinable slope with respect to the workpiece axis.

In conclusion, there have been shown and described various aspects of electromagnetic apparatus embodied according to this invention for the eddy current inspection of elongated workpieces. The essential feature of the invention is that the effective search coil scanning area revolves continuously about the workpiece without concomitant rotation of the workpiece or cumulative rotation of the scanning coil. This unique and expedient result is obtained by the translation of an encompassing search coil in a closed eccentric path about the workpiece axis. For example, a workpiece having elliptic cross sections transversely of its longitudinal centroidal axis may be accommodated by tilting the encompassing search coil about a lateral axis parallel with the major elliptic axes until the plane of the coil is parallel with the planes in which cross sections of the workpiece are circular.

While there have been described what are at present considered to be the preferred embodiments of this invention, it will be obvious to those skilled in the art that various changes and modifications may be made therein without departing from the invention and it is, therefore, aimed in the appended claims to cover all such changes and modifications as fall within the true spirit and scope of the invention.

What is claimed is:

1. Electromagnetic testing apparatus for the detection and measurement of discontinuities of a workpiece which is generally cylindrical about its centroidal axis, said apparatus comprising,
   an encircling electromagnetic search coil encompassing said workpiece and having a centroidal axis which is displaced from the workpiece axis thereby defining an equivalent search point at the position of the least radial separation of said coil and said workpiece,
   means translating said search coil in a closed path about the workpiece axis, and
   means restraining said search coil from cumulative rotation,
   whereby the equivalent search point is continuously revolved about the workpiece obviating rotation of said workpiece and said search coil.

2. Electromagnetic testing apparatus for the detection and measurement of discontinuities of a workpiece which is generally cylindrical with respect to a first axis of symmetry, said apparatus comprising,
   an encircling electromagnetic search coil encompassing said workpiece and having a second axis of symmetry which is oriented parallel with and displaced from said first axis thereby defining an equivalent search point at the position of the least radial separation of said coil and said workpiece,
   means translating said search coil in a circular path concentric with said first axis, and
   means restraining said search coil from cumulative rotation,
   whereby the equivalent search point is continuously revolved about the workpiece obviating rotation of said workpiece and said search coil.

3. The electromagnetic testing apparatus of claim 2 including,
   means translating said workpiece along said first axis at a substantially constant velocity whereby the equivalent search point is continuously revolved about the workpiece during translation of said workpiece to sweep out a helical search path covering substantially the entire workpiece surface.

4. The electromagnetic testing apparatus of claim 2 wherein said restraint means includes,
   a crank pin moved in a path duplicating said circular path and
   a connecting rod attached to said eccentric plate and rotatably engaging said crank pin.

5. Electromagnetic testing apparatus for the detection and measurement of discontinuities of a workpiece which is generally cylindrical with respect to a first axis of symmetry, said apparatus comprising,
   workpiece support means translatably supporting the workpiece for translation parallel with the first axis,
   an annular electromagnetic search coil having a second axis of symmetry and an internal radius substantially greater than the external radius of the workpiece,
   search coil support means orienting said coil eccentrically about the workpiece with said second axis parallel to the first axis, thereby defining an equivalent search point at the position of least radical separation of said coil and the workpiece,
   said search coil support means including a vertical plate, an eccentric plate rotatably mounted on said vertical plate for rotation about the first axis, and a coil plate supporting said coil and rotatably mounted eccentrically of and upon said eccentric plate,
   search coil motion means coupled with said eccentric plate rotating said eccentric plate continuously about the first axis, and
   search coil restraint means coupled with said coil plate restraining said coil plate from cumulative rotation,
   whereby the equivalent search point is continuously revolved about the workpiece obviating rotation of the workpiece and said search coil.

6. The electromagnetic testing apparatus of claim 5 wherein said restraint means includes,
   a first pin mounted on said vertical support plate,
   a second pin mounted on said coil plate, and
   a crank rotatably engaging one of said pins and slidably and rotatably engaging the other of said pins.

7. Electromagnetic testing apparatus for the detection and measurement of discontinuities of a workpiece which is generally cylindrical with respect to a first axis of symmetry, said apparatus comprising,
   workpiece support means translatably supporting the workpiece for translation parallel with the first axis,
   an annular electromagnetic search coil having a second axis of symmetry and an internal radius substantially greater than the external radius of the workpiece,
   search coil support means including first and second crank pins identically rotated about parallel axes, a translation plate rotatably engaging said crank pins,
   said search coil being mounted upon said translation plate eccentrically of and about said workpiece with said second axis parallel to said first axis thereby defining an equivalent search point at the position of least radial separation of said coil and said workpiece,
   whereby the equivalent search point is continuously revolved about the workpiece obviating rotation of said workpiece and said search coil.

No references cited.